United States Patent [19]

Brandstetter et al.

[11] 4,436,854

[45] Mar. 13, 1984

[54] SELF-EXTINGUISHING THERMOPLASTIC MOLDING MATERIAL

[75] Inventors: Franz Brandstetter, Neustadt; Volker Muench, Ludwigshafen; Herbert Naarmann, Wattenheim; Edmund Priebe, Frankenthal, all of Fed. Rep. of Germany

[73] Assignee: BASF Aktiengesellschaft, Fed. Rep. of Germany

[21] Appl. No.: 344,015

[22] Filed: Jan. 29, 1982

[30] Foreign Application Priority Data

Feb. 18, 1981 [DE] Fed. Rep. of Germany ....... 3105946

[51] Int. Cl.³ .......................... C08K 5/52; C08K 5/53; C08L 71/04
[52] U.S. Cl. .................................... 524/139; 524/141; 524/143; 524/151; 525/68
[58] Field of Search ............... 524/143, 414, 123, 129, 524/139, 141, 151; 525/68, 92, 132, 152, 143

[56] References Cited

U.S. PATENT DOCUMENTS

| | | | |
|---|---|---|---|
| 3,809,729 | 5/1974 | Reinhard | 260/874 |
| 3,883,613 | 5/1975 | Cooper | 260/874 |
| 3,981,841 | 9/1976 | Abolins et al. | 524/143 |
| 4,128,602 | 12/1978 | Katchman et al. | 525/132 |
| 4,128,604 | 12/1978 | Katchman et al. | 525/68 |
| 4,152,316 | 5/1979 | Cooper et al. | 524/414 |
| 4,154,775 | 5/1979 | Axelrod | 260/874 |
| 4,301,059 | 11/1981 | Cooper et al. | 525/68 |
| 4,368,293 | 1/1983 | Yamashita et al. | 525/68 |
| 4,373,064 | 2/1983 | Bennett, Jr. et al. | 525/68 |
| 4,376,186 | 3/1983 | Cooper | 525/68 |

FOREIGN PATENT DOCUMENTS

| | | |
|---|---|---|
| 2037510 | of 0000 | Fed. Rep. of Germany . |
| 2836771 | of 0000 | Fed. Rep. of Germany . |
| 1174214 | 12/1969 | United Kingdom . |

*Primary Examiner*—John Kight, III
*Assistant Examiner*—R. A. White
*Attorney, Agent, or Firm*—Keil & Witherspoon

[57] ABSTRACT

Self-extinguishing molding materials, comprising (A) a polymer of a vinyl-aromatic compound, especially a styrene polymer, which has been made impact-resistant (B) a polyphenylene ether and (C) a flameproofing additive, with or without (D) conventional additives, wherein one part of the soft component of the impact-resistant polymer of the vinyl-aromatic compound has a mean particle size of $\leq 1.5$ μm and the other part has a mean particle size of $\leq 3$ μm. Such molding materials not only have good self-extinguishing properties but also give moldings having a particularly uniform matt surface.

2 Claims, No Drawings

SELF-EXTINGUISHING THERMOPLASTIC MOLDING MATERIAL

The invention relates to a self-extinguishing thermoplastic molding material, comprising (A) from 70 to 10 parts by weight of a styrene polymer which has been made impact-resistant, (B) from 30 to 90 parts by weight of a polyphenylene ether and (C) from 1 to 20 parts by weight of a flameproofing additive, with or without (D) conventional additives, in effective amounts, which, after ignition with a hot flame, ceases to burn within a few seconds and does not drip burning particles.

Thermoplastic molding materials which are suitable for the production of moldings and which contain impact-resistant styrene polymers and polyphenylene ethers and are self-extinguishing are disclosed in, for example, German Published Application DAS No. 2,037,510 and U.S. Pat. No. 3,809,729. The flameproofing components in these molding materials are an aromatic phosphorus component together with an aromatic halogen compound. However, self-extinguishing molding materials can also be obtained without addition of halogen compounds, by using aromatic phosphates and cyclic phosphonates or phosphates, as described, for example, in U.S. Pat. Nos. 3,883,613 and 4,154,775 and German Laid-Open Application DOS No. 2,836,771. It is true that moldings produced from these materials have a matt surface, as desired for many applications, but the mattness is non-uniform and depends greatly on the processing conditions.

It is an object of the present invention to provide a thermoplastic molding material, based on an impact-resistant styrene polymer and a polyphenylene ether, which after ignition with a hot flame ceases to burn within a few seconds, does not drip burning particles, and gives a molding having a uniform matt surface, whose appearance is substantially independent of the processing conditions.

We have found that this object is achieved, according to the invention, by a molding material comprising an impact-resistant styrene polymer, a polyphenylene ether and a flameproofing additive, wherein from 98 to 10 percent by weight of the soft component of the impact-resistant styrene polymer employed have a mean particle size of 23 1.5 $\mu$m and from 2 to 90 percent by weight have a mean particle size of greater than 4 $\mu$m.

Accordingly, the invention relates to a self-extinguishing thermoplastic molding material comprising (A) from 70 to 10 parts by weight of one or more styrene polymers which have been made impact-resistant, (B) from 30 to 90, especially from 40 to 70, parts by weight of a polyphenylene ether and (C) from 1 to 20, especially from 2 to 12, parts by weight of a flameproofing additive, with or without (D) conventional additives, in effective amounts, wherein from 98 to 10, preferably from 90 to 20 percent by weight of the soft component of the impact-resistant styrene polymer have a mean particle size of $\leq 1.5$ $\mu$m, preferably of from 0.3 to 1.2 $\mu$m, and from 2 to 90, preferably from 10 to 80, percent by weight have a mean particle size of $>3$ $\mu$m, preferably of from 4 to 10 $\mu$m.

For the purposes of the present invention, a molding material is a mixture which can be converted by thermoplastic processing methods, within a certain temperature range, to moldings or to rod, sheet or tube. The molding material may be in the form of granules or powder.

The impact-resistant styrene polymers contained in the molding material can be prepared by any method which ensures that the above particle size distributions result. However, it is also possible to blend impact-resistant styrene polymers whose soft components have different particle sizes. For example, the styrene polymer contained in the novel molding material can be obtained by blending 80 parts by weight of a polymer having a mean particle size of 0.5 micron with 10 parts by weight of a polymer having a mean particle size of 6 1 micron or by blending 61 parts by weight of a polymer having a mean particle size of 1 micron with 4 parts by weight of a polymer having a mean particle size of 6 micron.

The most commonly used methods of preparation of an impact-resistant styrene polymer (component A) are mass polymerization and solution polymerization, for example as described in U.S. Pat. No. 2,694,692, and mass-suspension polymerization, as described, for example, in U.S. Pat. No. 2,862,906.

The rubbers used are the conventional natural or synthetic rubbers usually employed for making a styrene polymer impact-resistant. Suitable rubbers, for the purposes of the invention, are natural rubber as well as, for example, polybutadiene, polyisoprene and copolymers—having a glass transition temperature below $-20°$ C.—of butadiene and/or isoprene with styrene and other comonomers. Butadiene polymers having a 1,4-cis content of from 25 to 98 are particularly suitable.

The impact-resistant polymers having the pattern of properties required by the invention are prepared by polymerizing the styrene in the presence of the rubber. As stated, the polymerization is as a rule carried out by conventional mass polymerization, solution polymerization or aqueous dispersion polymerization methods, the rubber being first dissolved in the polymerizable monomer and this starting solution then being polymerized.

In solution polymerization, up to 50% by weight, based on styrene employed, of an inert diluent can be added to this starting solution. Examples of suitable inert diluents are aromatic hydrocarbons or mixtures of these; toluene, ethylbenzene, xylenes or mixtures of these are particularly preferred.

In aqueous dispersion polymerization, a solvent is in general not added; in a particularly advantageous embodiment, the solution of the rubber in the monomer is mass-prepolymerized, under the action of shearing forces, to a conversion of about 45%, and is then suspended in water, after which the polymerization is completed. In general, this process is initiated by adding oil-soluble free radical initiators, eg. benzoyl peroxide, dicumyl peroxide, di-tert.-butyl peroxide, azodiisobutyronitrile or the like, or combinations of these, but the prepolymerization can also be started thermally. The suspending agents used are conventional water-soluble high molecular weight compounds, eg. methylcellulose, hydroxypropylcellulose, polyvinyl alcohol, partially hydrolyzed polyvinyl acetate or the like, or inorganic dispersing agents, eg. barium sulfate. In general, the suspending agent is used in an amount of from 0.1 to 5% by weight, based on the organic phase.

Mass polymerization or solution polymerization is as a rule carried out at from 50° to 250° C., preferably from 100° to 200° C. The polymerization batch must be stirred thoroughly, at least in the first stage of the polymerization, ie. up to a conversion of 45% by weight, or less, of the monovinyl-aromatic compound. All these polymerization methods are well known and are described in detail in the literature. A summary is given by Amos, Polym. Engng. Sci., 14 (1974), No. 1, 1–11 and in U.S. Pat. Nos. 2,694,692 and 2,862,906, to which reference may be made for further details.

For the purposes of the present invention, the soft component is that part of the impact-resistant polymer which is insoluble in toluene at room temperature (25° C.), minus any pigment. Accordingly, the soft component corresponds to the gel phase of the product.

The soft component in general has a non-uniform structure; the component is as a rule formed during the process of preparation, and its amount and state of division are affected by the process conditions. As is well known, the solution of the rubber in the monovinyl-aromatic monomer, when subjected to polymerization, separates, immediately after the start of the reaction, into two phases, of which one, namely a solution of the rubber in the monomeric vinyl-aromatic, initially forms the coherent phase, whilst the second, a solution of the polyvinyl-aromatic in its own monomer, remains suspended in droplets in the coherent phase. With increasing conversion, the amount of the second phase increases at the expense of the first, the monomer being consumed, and phase inversion occurs. This means that droplets of rubber solution in the polyvinyl-aromatic solution form, but these droplets, in turn, enclose smaller droplets of what is now the outer or continuous phase.

In addition to this process, a grafting reaction takes place, in which chemical linkages are formed between the rubber molecules and the polyvinyl-aromatic, with formation of a graft copolymer from the two components. This process is known and is described in detail by, for example, Fischer, Angew. Makromol. Chem. 33 (1973), 35–74.

The grafted-on proportion of the polyvinyl-aromatic and the proportion of the polyvinyl-aromatic mechanically enclosed in the rubber particles, are both to be regarded as part of the soft component.

When the mass has polymerized completely, what has been formed is a hard matrix of the polyvinyl-aromatic in which is embedded a heterogeneous soft component which consists of grafted rubber particles containing enclosed matrix material (polyvinyl-aromatic). The greater the amount of the enclosed matrix material, the greater, for a given rubber content, is the amount of soft component.

Accordingly, the amount of soft component depends not only on the amount of rubber employed but also on how the process is conducted, especially before and during phase inversion. The detailed measures to be taken are specific to the process and are known to a skilled worker (cf., for example, Freeguard, Brit. Polym. J. 6 (1974), 203–228; Wagner and Robeson, Rubber Chem. Techn. 43 (1970), 1129 et seq.).

In order to arrive at impact-resistant thermoplastic molding materials having the properties according to the invention, the amount of rubber which, before polymerization, is dissolved in the monomer to prepare the starting solution is chosen, as a function of the final conversion during polymerization, in such a way that the content of soft component in the resulting impact-resistant styrene polymer is not less than 20% by weight, preferably 25% by weight or more, based on impact-resistant polymer. The upper limit of the content of soft component is about 50–60% by weight and is imposed by the requirement that the polyvinyl-aromatic must form the coherent phase. To obtain the novel thermoplastic molding materials, a content of soft component of 25–35% by weight, based on the impact-resistant polymer, has proved particularly advantageous. The rubber content of the impact-resistant polymer is correspondingly in general from 2 to 15% by weight, preferably from 5 to 12% by weight.

As has been explained and is well known, the impact-resistant styrene polymer consists of a homogeneous outer phase or matrix of the styrene polymer, in which is embedded a disperse phase consisting of the rubber particles of the soft component, the rubber particles having become partially crosslinked, and, to a greater or lesser degree, grafted with monovinyl-aromatic compound during the polymerization.

The mean particle size of the disperse soft component can be determined by, for example, counting and evaluation of electron micrographs of thin sections of the impact-resistant polymer (cf. F. Lenz, Zeitschrift für Wiss. Mikroskopie, 63 (1956), 50–56).

The particle size of the disperse soft component phase is adjusted, in a conventional manner, during polymerization of the monomer-aromatic compound by appropriate choice of the stirring speed in the first stage of the polymerization, ie. up to a monomer conversion of 45% or less. The particle size of the disperse soft component phase is larger, the lower the stirrer speed and accordingly the lower the shearing stress. The relationship between stirrer speed and size and distribution of the rubber particles in the impact-resistant polymer obtained is described, for example, in the paper by Freeguard, mentioned above, to which reference may be made for further details. This particular stirring speed required to achieve the desired particle size of a disperse soft component phase depends, inter alia, on the details of the particular apparatus and is known to a skilled worker or can be established by a small number of simple experiments.

The mean (weight-average) particle size of the disperse soft component phase was determined from electron micrographs of thin sections, by counting and averaging the particles belonging to each given size category (each category covering an equal size range). The cumulative distribution curve is determined from the volume of the particles (3rd power of the apparent diameter) within each range. The equivalent diameter is the abscissa value corresponding to the 50% ordinate value. The mean diameters quoted are the mean of not less than 5,000 particles.

Component (B) is a polyphenylene ether based on ortho-disubstituted polyphenylene oxides, the ether oxygen of one unit being bonded to the benzene nucleus of the adjacent unit. The average molecular length should correspond to not less than 50 units. The polyphenylene ethers may contain, in the ortho-position to the oxygen: halogen, hydrocarbon radicals which do not contain any tertiary hydrogen in the α-position, halohydrocarbon radicals, phenyl radicals and hydrocarbon-oxy radicals. Accordingly, suitable polymers include poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4- phenylene)-ether and poly-(2,6-dibromo-1,4-phenylene)-ether. Preferably poly-(2,6-dimethyl-1,4-phenylene)-ether is employed, more especially with an intrinsic viscosity of from 0.45 to 0.65 dl/g (measured in chloroform at 30° C.).

The polyphenylene ethers can, for example, be prepared from the phenols in the presence of complexing agents such as copper bromide and sec.-dibutylamine.

Suitable flameproofing agents to be employed as component (C) of the novel molding material include phosphorus-containing compounds and/or halogen-containing compounds. Specific examples are compounds in which phosphorus has an oxidation state of +1, eg. the hypophosphites, in which the cations may be those of elements of main groups I, II and III and sub-groups I to VIII of the Periodic Table, the lanthanide group, germanium, tin, lead, antimony and bismuth, the Periodic Table being the Mendeleef system as reproduced, for example, in the textbook "Anorganische Chemie" by F. A. Cotton and G. Wilkinson, Verlag Chemie (1967).

The term "oxidation state" is to be regarded as equivalent to such terms as oxidation number, charge number and the like, as given in the Lehrbuch der anorganischen Chemie by A. F. Hollemann, E. Wiberg, Walter de Gruyter and Co. (57th-70th edition, 1964), pages 166–177.

Double phosphites of the structure CeMe(H$_2$PO$_2$)$_6$, where Me is erbium, thulium, ytterbium and lutetium, may also be used, as may complex hypophosphites, for example Me[Zr(H$_2$PO$_2$)$_6$] or Me[Hf(H$_2$PO$_2$)$_6$], where Me is magnesium, calcium, manganese, cobalt, nickel, iron, zinc and cadmium.

In addition to these inorganic hypophosphites, organic hypophosphite may also be employed, examples of suitable compounds being cellulose hypophosphite esters, polyvinyl alcohl hypophosphite esters, and esters of hypophosphorous acid with diols, eg. with 1,10-dodecanediol.

A very particularly suitable compound is calcium hypophosphite.

However, component (C) can also be an aromatic phosphorus compound of the general formula

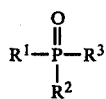

where R$^1$, R$^2$ and R$^3$ may be identical or different and each is aryl, alkyl, cycloalkyl, alkyl-substituted aryl, halogen-substituted aryl, aryl-substituted alkyl, halogen, hydrogen, the corresponding aryloxy, alkoxy and cycloalkoxy radicals and their combinations, at least one of the radicals being aryl or aryloxy. Specific examples are triphenylphosphine oxide, phenyl bis-dodecyl phosphate, phenyl bis-neopentyl phosphate, phenylethylene hydrogen phosphate, phenyl bis-(3,5,5'-trimethylhexyl) phosphate, ethyl diphenyl phosphate, 2-ethylhexyl di-(p-tolyl) phosphate, diphenyl hydrogen phosphate, bis-(2-ethylhexyl) p-tolyl phosphate, tritolyl phosphate, bis-(2-ethylhexyl) phenyl phosphate, tri-(nonylphenyl) phosphate, phenyl methyl hydrogen phosphate, di-(dodecyl) p-tolyl phosphate, tricresyl phosphate, triphenyl phosphate, dibutyl phenyl phosphate, 2-chloroethyl diphenyl phosphate, p-tolyl bis-(2,5,5'-trimethylhexyl) phosphate, 2-ethylhexyl diphenyl phosphate and diphenyl hydrogen phosphate.

Phosphorus compounds in which each R is aryloxy or aryl, especially triphenylphosphine oxide and triphenyl phosphate, are particularly suitable.

Component (C) can also be a cyclic phosphate or phosphonate or a simple phosphonate, such compounds being described, for example, in U.S. Pat. Nos. 3,090,799 and 3,141,032.

Diphenyl pentaerythritol diphosphate and diphenyl phenylphosphonate have proved particularly suitable.

Component (C) can also be a conventional halogen-containing flameproofing agent, for example a halogen-containing organic compound as described, eg., in the monograph by H. Vogel "Flammfestmachen von Kunststoff", Hüthig Verlag, 1966, pages 94–102. However, halogenated polymers, eg. halogenated polyphenylene oxide or brominated oligostyrene or polystyrene, may also be used. The compound employed should contain more than 30% by weight of halogen, preferably more than 40% by weight of chlorine or more than 50% by weight of bromine. Particularly suitable flameproofing agents are hexabromocyclododecane, octabromohexadecane, bis-(tribromophenoxy)-ethane, chloroparaffin containing about 70 percent by weight of chlorine, halogen-containing Diels-Alder adducts, halodiphenyls, as described in German Laid-Open Application DOS No. 2,328,517 and U.S. Pat. Nos. 3,894,988 and 3,892,710, and brominated oligostyrene, as described in U.S. Pat. No. 4,143,221.

When a halogen-containing flameproofing agent is employed, it is advantageous also to use a synergistic agent, such as an antimony compound, eg. Sb$_2$O$_3$, SbCl$_3$, SbI$_3$ or SbOCl, an arsenic compound, eg. As$_2$O$_3$ or As$_2$O$_5$, a boron compound, eg. ZnBO$_4$, BaB$_2$O$_4$.H$_2$O or 2ZnO.3B$_2$O$_3$.5H$_2$O or a tin compound, e.g. tin-II oxide hydrate and SnO$_2$. These synergistic agents are in general employed in an amount of from 0.5 to 10% by weight, based on the thermoplastic molding material.

As component (D), the mixture can contain further additives, such as pigments, fillers, oligomers, polymers, antistatic agents, antioxidants and lubricants.

The novel thermoplastic molding materials are prepared in a conventional manner on apparatus which permits homogeneous mixing, eg. a kneader, extruder or roll mill.

Moldings prepared from the novel composition are not only self-extinguishing but also have a uniform matt surface.

The novel molding material can be processed by conventional thermoplastic methods, for example extrusion and injection molding, to give a great variety of moldings, for example back panels of television sets, and molded automotive components.

The examples which follow illustrate the invention. Parts and percentages are by weight unless stated otherwise.

The flameproofing effect is tested by the Underwriter Laboratories vertical burning test, to permit classification in fire class 94 VE-0, 94 VE-1 or 94 VE-2. To test the homogeneous mattness of the surface of the moldings, small test boxes, as described by E. Zahn and K. Wiebusch in Kunststoffe, No. 11, 1966, page 6, are produced on an injection molding machine at 200° and 300° C. injection temperature, and 30° C. mold temperature, and the surface of these boxes was assessed visually.

EXAMPLES AND COMPARATIVE EXPERIMENTS

An impact-resistant polystyrene having a mean particle size of the soft component of ≦0.5 μm was obtained with the following recipe:

A solution consisting of 1,560 g of styrene, 240 g of a butadiene/styrene block copolymer with a gradual transition between the blocks ($[\eta]$=1.74 [dl/g] (in toluene at 25° C.); polystyrene block=31.0%; $[\eta]$=0.364 [dl/g] (in toluene at 25° C.); total styrene content=41.6%), 1.6 g of t-dodecylmercaptan, 2.2 g of octadecyl 3-(3',5'-ditert.-butyl-4-hydroxyphenyl)-propionate and 1.7 g of dicumyl peroxide was prepolymerized, in a 5 liter stirred kettle with blade stirrer, at 110° C. internal temperature and a stirrer speed of 150 rpm, to a solids content of 43.8% by weight.

1,800 ml of water, containing 9.0 g of polyvinyl-pyrrolidone of K value 90 and 1.8 g of $Na_4P_2O_7$, were then added and the stirrer speed was increased to 300 rpm. Polymerization was continued for 5 hours at 120° C. and 5 hours at 140° C., giving a styrene conversion of 99%.

An impact-resistant polystyrene having a mean particle size of the soft component of about 1 μm was prepared from the following recipe:

A mixture of 7.2 parts by weight of a polybutadiene having a cis-content of 98%, 85.7 parts by weight of styrene, 6 parts by weight of ethylbenzene and 0.1 part by weight of octadecyl 3-(3',5'-ditert.-butyl-4'-hydroxyphenyl)-propionate was thermally polymerized in a 2 kettle/2 tower cascade. The throughput was 4 liters/hour. The stirrer speeds and temperatures employed in the individual reactors, and the cumulative conversions, are shown below. In the third reactor, 0.02% by weight, based on styrene, of tert.-dodecylmercaptan was added continuously to the polymer stream. After polymerization, the mixture was freed from solvent and residual monomer in a devolatilization zone at 220°-240° C.

| Position | Stirrer speed [rpm] | Temp. [°C.] | Conversion (cumulative) |
|---|---|---|---|
| 1st stirred reactor | 100 | 104 | 3.8 |
| 2nd stirred reactor | 160 | 132 | 20.3 |
| 1st tower | 15 | 101 | 55.3 |
| 2nd tower | 3 | 127 | 84.3 |
| Devolatilization | — | 250 | — |

An impact-resistant polystyrene having a mean particle size of the soft component of 6 μm was prepared as follows:

A solution consisting of 1,283 g of styrene, 112 g of polybutadiene (1,2-vinyl content about 9% by weight), 1.5 g of t-dodecylmercaptan, 1.5 g of octadecyl 3-(3',5'-di-tert.-butyl-4'-hydroxyphenyl)-propionate and 1.5 g of dicumyl peroxide was prepolymerized, in a 4 liter stirred kettle with blade stirrer, at 110° C. internal temperature and a stirrer speed of 150 rpm, to a solids content of 25.4% by weight. 1,800 ml of water, containing 9 g of polyvinylpyrrolidone of K value 90 and 1.8 g of $Na_4P_2O_7$, were then added and the stirrer speed was increased to 300 rpm. Polymerization was then continued for 3 hours at 110° C., 3 hours at 120° C. and 4 hours at 140° C. to give a styrene conversion of >99%.

The compositions according to the invention are obtained by blending the impact-resistant polystyrenes described.

The parts by weight of impact-resistant polystyrene (component A), poly-(2,6-dimethyl-1,4-phenylene)-ether (component B) and flameproofing additive (component C) shown in the table were melted in a twin-screw extruder at 280° C., homogenized, mixed and granulated. The poly-(2,6-dimethyl-1,4-phenylene)-ether had an intrinsic viscosity of 0.48 dl/g (measured in chloroform at 30° C.).

TABLE

| | Component A | | | Component B Poly-(2,6-dimethyl-1,4-phenylene-ether | Component C Flameproofing additive | | Fire Class according | Surface appearance Mattness | |
|---|---|---|---|---|---|---|---|---|---|
| | [Parts by weight] | Percent by weight of mean particle size | | [parts by weight] | Type | [Parts by weight] | to UL-94 | 280° C. | 300° C. |
| | | ≦1.5 μm | >3 μm | | | | | | |
| Example (according to the invention) | | | | | | | | | |
| 1 | 70 | 90 | 10 | 30 | Calcium hypophosphite | 6 | VE-1 | uniform | uniform |
| 2 | 60 | 90 | 10 | 40 | Calcium hypophosphite | 4 | VE-1 | uniform | uniform |
| 3 | 50 | 90 | 10 | 50 | Calcium hypophosphite | 7 | VE-0 | uniform | uniform |
| 4 | 60 | 90 | 10 | 40 | Triphenyl phosphite | 5 | VE-1 | uniform | uniform |
| 5 | 50 | 90 | 10 | 50 | Triphenyl phosphite | 10 | VE-0 | uniform | uniform |
| 6 | 60 | 80 | 20 | 40 | Dimethyl pentaerythritol diphosphonate | 2.5 | VE-1 | uniform | uniform |
| 7 | 50 | 90 | 10 | 50 | Triphenylphosphine oxide | 8 | VE-0 | uniform | uniform |
| 8 | 50 | 80 | 20 | 50 | Triphenylphosphine oxide | 8 | VE-0 | uniform | uniform |
| 9 | 50 | 60 | 40 | 50 | Triphenylphosphine oxide | 8 | VE-0 | uniform | uniform |
| 10 | 50 | 50 | 50 | 50 | Triphenyl phosphate | 10 | VE-0 | uniform | uniform |

TABLE-continued

| | Component A | | | Component B Poly-(2,6-dimethyl-1,4-phenylene-ether [parts by weight] | Component C Flameproofing additive | | Fire Class according to UL-94 | Surface appearance Mattness | |
|---|---|---|---|---|---|---|---|---|---|
| | [Parts by weight] | Percent by weight of mean particle size | | | | | | | |
| | | ≦1.5 μm | >3 μm | | Type | [Parts by weight] | | 280° C. | 300° C. |
| Comparative Experiments (not according to the invention) | | | | | | | | | |
| A | 70 | 100 | 0 | 30 | Calcium hypophosphite | 6 | VE-1 | non-uniform | non-uniform |
| B | 60 | 100 | 0 | 40 | Calcium hypophosphite | 4 | VE-1 | non-uniform | non-uniform |
| C | 50 | 100 | 0 | 50 | Calcium hypophosphite | 7 | VE-0 | non-uniform | non-uniform |
| D | 60 | 100 | 0 | 40 | Triphenyl phosphate | 5 | VE-1 | non-uniform | non-uniform |
| E | 50 | 100 | 0 | 50 | Triphenyl phosphate | 10 | VE-0 | non-uniform | non-uniform |
| F | 60 | 100 | 0 | 40 | Dimethyl pentaerythritol diphosphonate | 2.5 | VE-1 | non-uniform | non-uniform |
| G | 50 | 5 | 95 | 50 | Triphenyl phosphate | 10 | VE-0 | non-uniform | non-uniform |

We claim:

1. A self-extinguishing thermoplastic material comprising
   (A) from 70 to 10 parts by weight of an impact-resistant styrene polymer containing a soft component based on a grafted polybutadiene or a grafted copolymer of butadiene and styrene,
   (B) from 30 to 90 parts by weight of a polyphenylene ether and
   (C) from 1 to 20 parts by weight of a phosphorus-containing compound as flameproofing additive, wherein the soft component of the impact-resistant styrene polymer (A) consists essentially of a mixture of from 98 to 10 percent by weight of particles having a mean particle size of from 0.3 to 1.2 μm and from 2 to 90 percent by weight of particles having a mean particle size of from 4 to 10 μm and wherein said mixture is obtained by blending impact-resistant styrene polymers whose soft components have different particle sizes.

2. A molding material as set forth in claim 1, wherein the phosphorus-containing compound is a phosphite, a phosphate or a phosphine oxide.

* * * * *

UNITED STATES PATENT AND TRADEMARK OFFICE
CERTIFICATE OF CORRECTION

PATENT NO. : 4,436,854
DATED : January 29, 1984
INVENTOR(S) : Franz BRANDSTETTER It is certified that error appears in the above-identified patent and that said Letters Patent is hereby corrected as shown below:

On the title page

IN THE ABSTRACT:

Line 9, should read:

>3µm rather ⩾3µm

Signed and Sealed this

Nineteenth Day of June 1984

[SEAL]

Attest:

Attesting Officer

GERALD J. MOSSINGHOFF

Commissioner of Patents and Trademarks